United States Patent [19]

Nelle et al.

[11] 4,295,742
[45] Oct. 20, 1981

[54] LONGITUDINAL MEASURING DEVICE

[75] Inventors: Gunther Nelle, Bergen; Gunter Swassek, Traunreut, both of Fed. Rep. of Germany

[73] Assignee: Dr. Johannes Heidenhain GmbH, Traunreut, Fed. Rep. of Germany

[21] Appl. No.: 17,057

[22] Filed: Mar. 2, 1979

[30] Foreign Application Priority Data

Mar. 10, 1978 [DE] Fed. Rep. of Germany ....... 2810341

[51] Int. Cl.³ ............................................ G01B 11/14
[52] U.S. Cl. .................... 356/373; 33/125 C; 356/375
[58] Field of Search ................. 356/373–374, 356/395–396, 243, 256, 375; 250/231 SE, 237 R, 237 G; 33/125 C

[56] References Cited

U.S. PATENT DOCUMENTS

| 3,816,003 | 6/1974 | Litke | 33/125 C |
| 4,037,325 | 7/1977 | Weber et al. | 33/125 C |
| 4,063,086 | 12/1977 | Hirose | 250/237 G |
| 4,070,759 | 1/1978 | Nelle | 33/125 C |
| 4,149,319 | 4/1979 | Nelle | 33/125 C |
| 4,152,837 | 5/1979 | Nelle et al. | 356/374 |
| 4,169,316 | 10/1979 | Ernst | 33/125 C |

FOREIGN PATENT DOCUMENTS

| 2349944 | 4/1974 | Fed. Rep. of Germany . |
| 2505586 | 10/1977 | Fed. Rep. of Germany . |
| 2628623 | 12/1977 | Fed. Rep. of Germany . |
| 2510219 | 5/1978 | Fed. Rep. of Germany . |
| 2505587 | 6/1978 | Fed. Rep. of Germany . |
| 182102 | 4/1936 | Switzerland ........................ 356/373 |

Primary Examiner—William H. Punter
Attorney, Agent, or Firm—Hume, Clement, Brinks, Willian & Olds, Ltd.

[57] ABSTRACT

A guiding apparatus for guiding and positioning a scanning unit in a longitudinal measuring device is disclosed wherein the measuring device includes a measuring scale, a driving unit for connecting the device to an object whose position is to be measured, and first and second guide surfaces for guiding the scanning unit along the scale. In the preferred embodiment the guiding apparatus comprises a flexible coupling rod or wire which connects the scanning unit to the driving unit in a flexible manner while maintaining a constant spacing therebetween and first and second springs which bias the scanning unit into contact with the first and second guide surfaces, respectively. Improved guiding and positioning are obtained by separating the coupling function from the guiding function and by using separate springs to bias the scanning unit against the two guide surfaces.

6 Claims, 8 Drawing Figures

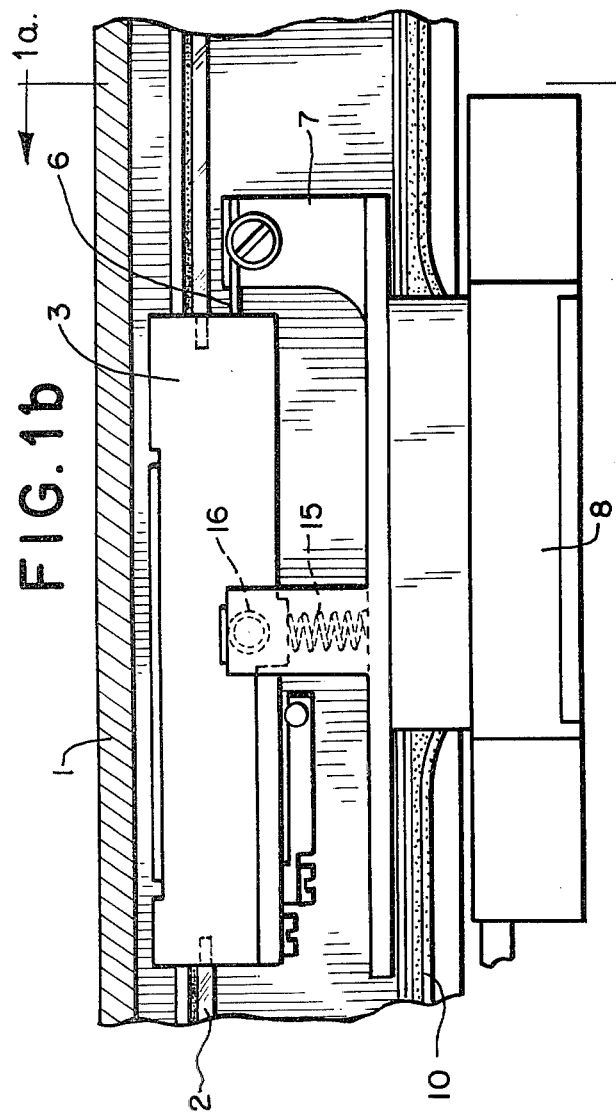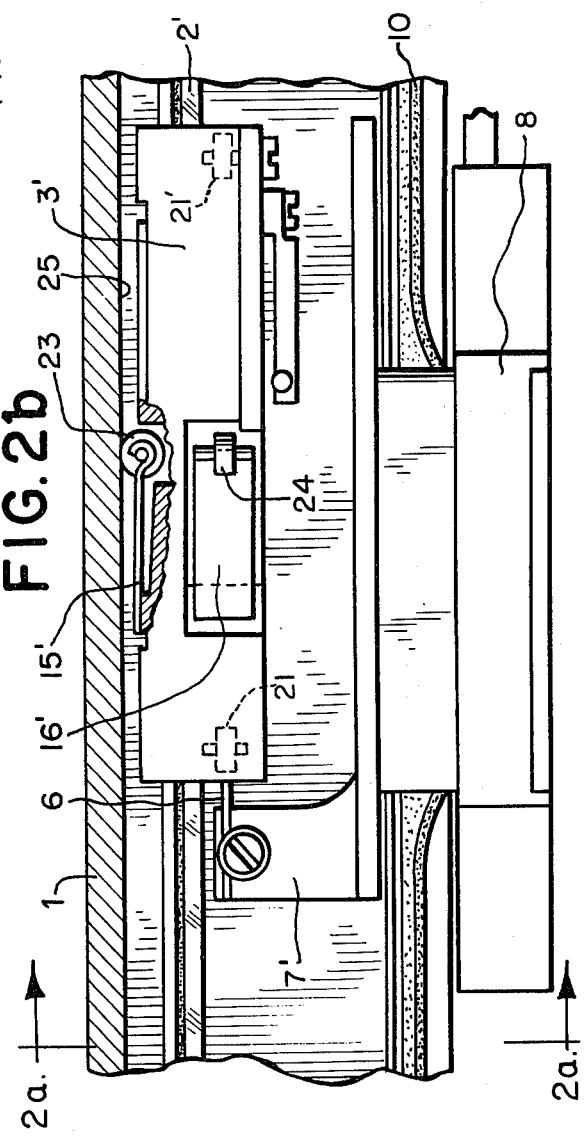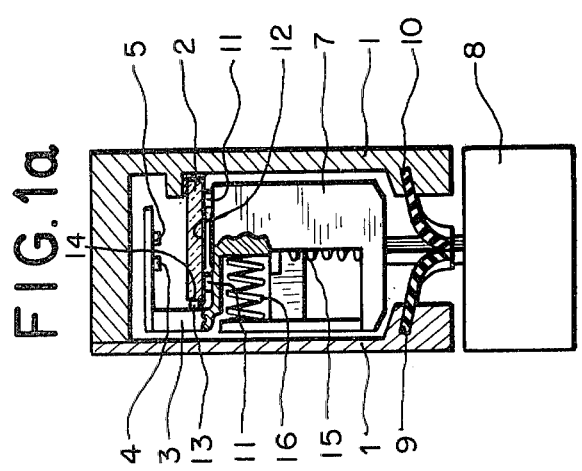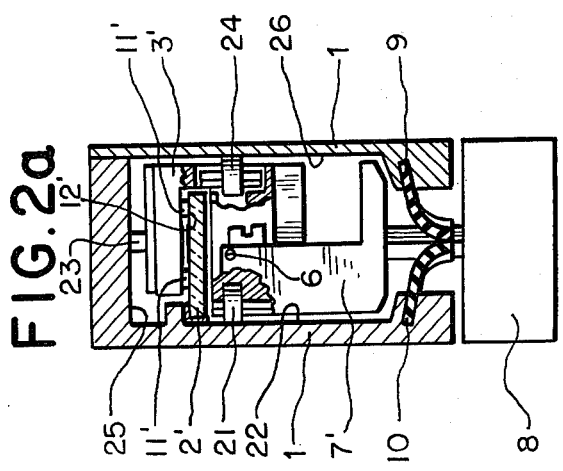

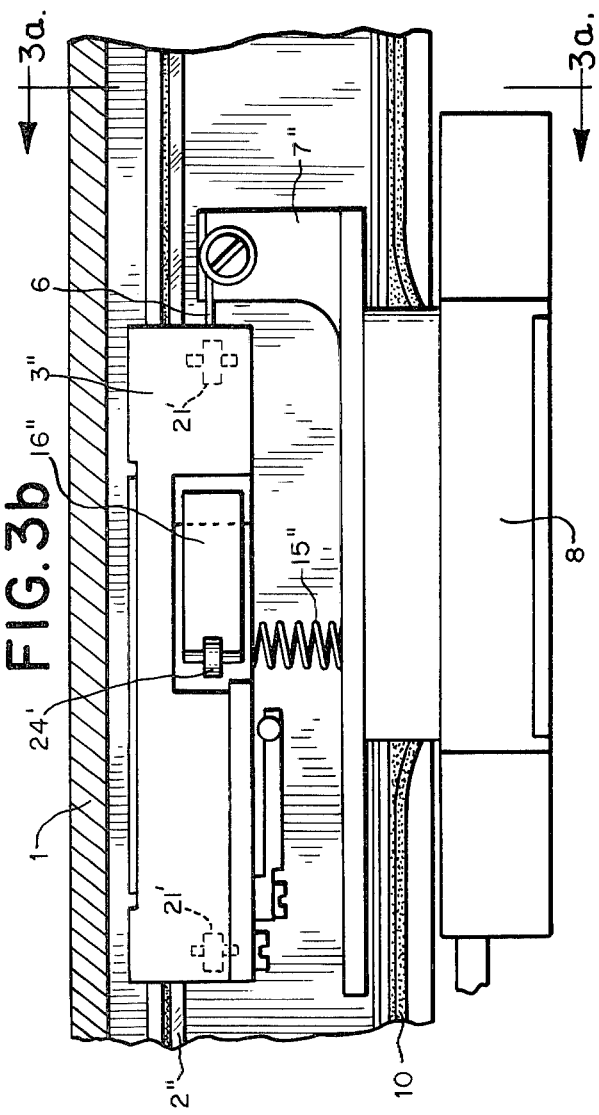
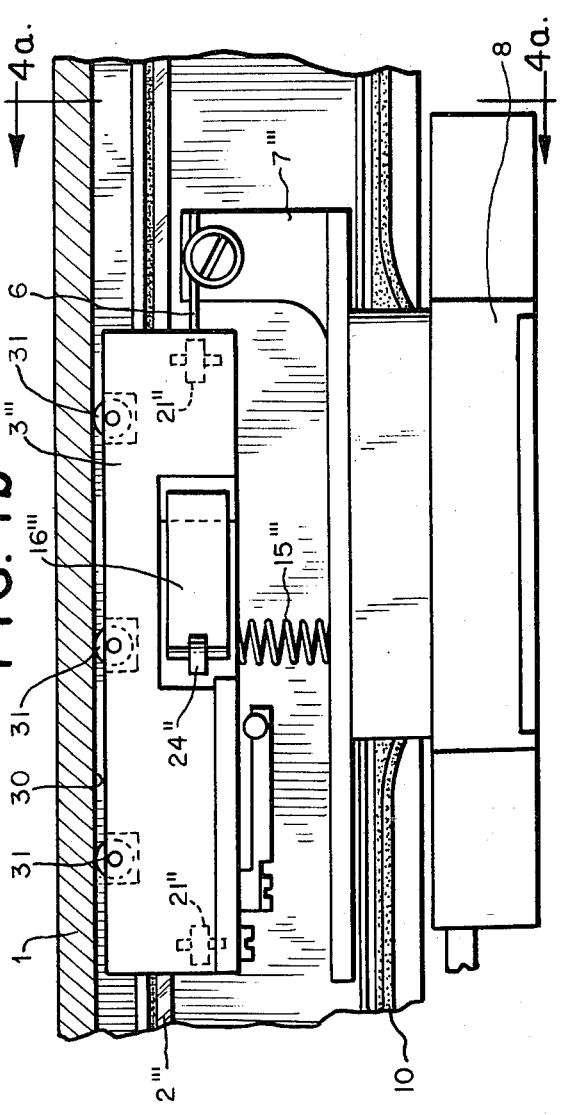
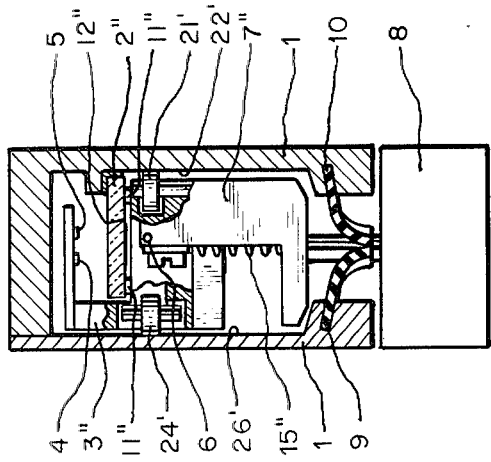
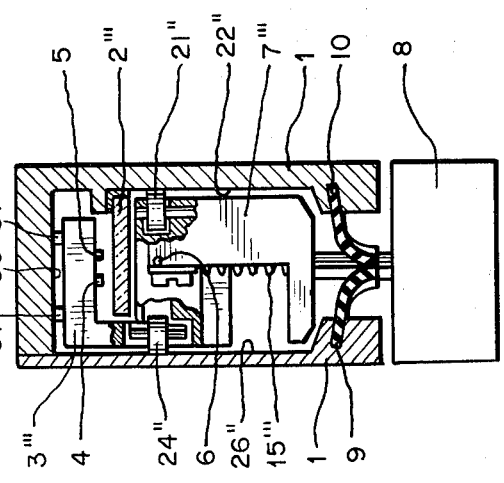

LONGITUDINAL MEASURING DEVICE

BACKGROUND OF THE INVENTION

The present invention relates in general to a longitudinal measuring device having a graduated measuring scale mounted on a support structure and a scanning unit for scanning the scale. More specifically, this invention relates to such measuring devices in which the scanning unit is coupled to a driving unit which is connected to the object whose position is to be measured, and in which the scanning unit is positioned against two guide surfaces of the scale and/or the support structure. This type of measuring instrument is often used in measuring the relative movements of moveable machine parts, as for example in numerically controlled machine tools.

The measuring instrument described in West German OS No. 23 49 944 utilizes a spring loaded arm to couple the scanning unit to the driving unit. This spring loaded arm is connected to the driving unit at one end and is provided with a spherical surface at the other end that enters into a recess formed in the scanning unit. In addition to performing the coupling function, this spring loaded arm also provides a positioning force which acts to press the scanning unit against two mutually perpendicular guide surfaces of the instrument.

U.S. Pat. No. 3,816,003 describes means for coupling a scanning unit to a driving unit which includes a wire which is clamped with one end to the driving unit and is provided with a bend at the other end which clamps into a recess formed in the scanning unit. As in the previously described instrument, this coupling means also acts to provide a spring force for pressing the scanning unit onto two mutually perpendicular guide surfaces of the instrument.

Measuring instruments such as these have the disadvantage that the two functions of coupling and guiding the scanning unit are performed by a single structure. Thus, the two functions are not separated from one another and an optimal coupling of the scanning unit to the driving unit, for example in the neutral phase, is generally not possible. Furthermore, when the scanning unit is pressed against two mutually perpendicular guide surfaces by the same spring arm, the positioning forces often cannot be optimally adjusted. Because a single diagonally operating spring forces presses the scanning unit onto both guide surfaces, the seating force on either of these surfaces cannot be easily or accurately set without affecting the seating force on the other surface.

In West German OS No. 2 510 219 the scanning unit is coupled to the driving unit in two mutually perpendicular planes in a flexible manner via plate springs and/or kink resistant wires. The scanning unit is guided onto two guide surfaces, which are also mutually perpendicular, by means of guide shoes which bear on the scale and rollers which bear as the support structure. The guiding forces are provided by plate springs which are installed diagonally with regard to the two guide surfaces. These plate springs are attached to the scanning unit and bear on the support structure via a roller. In this arrangement the functions of coupling and guiding the scanning unit are separated from each other; however, the use of diagonally positioned plate springs to press the scanning unit against the two mutually perpendicular guide surfaces of the scale and the support structure presents the same disadvantages that have already been mentioned.

SUMMARY OF THE INVENTION

The present invention is directed to an improved longitudinal measuring instrument of the general type described above, but which is less subject to the above-mentioned disadvantages. According to this invention, means for coupling a scanning unit to a driving unit are provided, which means operate independently of the means for guiding the scanning unit with respect to the scale. The coupling means includes coupling element which flexibly connects the driving unit to the scanning unit and maintains a substantially constant space therebetween. The guiding means includes a pair of pressure springs, each of which biases the scanning unit against one of two guide surfaces formed by the scale and/or the support structure.

One of the important advantages of this invention is the fact that, by separating the functions of coupling and guiding the scanning unit, both an optimal connection of the scanning unit to the driving unit, for example in the neutral phase, and separate setting of the pressure force for the scanning unit against individual guide surfaces becomes possible. This feature of the invention permits a reduction in the guiding forces exerted on the scale and resulting bending and measurement errors.

In a first preferred embodiment of the invention, the pressure springs which hold the scanning unit against the guide surfaces rest at one end on the scanning unit itself and at the other end on the driving unit.

In a second preferred embodiment the pressure springs bear at one end on the scanning unit and at the other end on the support structure via rollers.

In yet another preferred embodiment, one of the pressure springs bears at one end on the scanning unit and at the other end on the driving unit while the other pressure spring bears at one end on the scanning unit and at the other end via rollers on the support structure.

The novel features which are believed to be characteristic of the invention are set forth in the appended claims. The invention itself, together with further objects and attendant advantages, will best be understood by reference to the following description taken in conjunction with the accompanying drawings.

BRIEF DESCRIPTION OF THE DRAWINGS

FIGS. 1a and 1b are two section views of a first preferred embodiment of the invention.

FIGS. 2a and 2b are two sectional views of a second preferred embodiment of the invention.

FIGS. 3a and 3b are two sectional views of a third preferred embodiment of the invention.

FIGS. 4a and 4b are two sectional views of a fourth preferred embodiment of the invention.

DETAILED DESCRIPTION OF PREFERRED EMBODIMENTS

Referring now to the drawings, FIGS. 1a and 1b depict a first preferred embodiment of the invention. This embodiment includes a longitudinal measuring device in which a measuring scale is adhesively bonded to a support structure or housing 1. The grid scale formed on the scale 2 is scanned by a scanning unit 3 by means of a scanning plate (not shown). The grid scale of the scale 2 and the scanning plate are illuminated by a lighting installation, including a lamp and a condensor (not shown) attached to the scanning unit. Light that passes through both the scale 2 and the scanning plate strikes a pair of photosensors 4,5 installed on the scanning unit 3. The output signals of these photosensors 4,5 are transmitted to external signal processing circuitry (not shown) for the determination of the relative position of the scanning unit 3 with respect to the scale 2. The scanning unit 3 is held adjacent the scale 2 in a near neutral phase and a flexible manner by connecting, or coupling, means such as a wire 6 which is secured to both the scanning unit 3 and driving unit 7. The coupling wire 6 connects the driving unit 7 to the scanning unit 3 such that the driving unit 7 through the wire 6 exerts force on the scanning unit 3 only in the direction parallel to the measuring scale 2 and exerts substantially no force on the scanning unit 3 in any other direction. The base 8 of the driving unit 7 includes a blade which extends out of the housing 1 for connection with the object, for example, a machine plate, whose position is to be measured. The inside of the casing 1, which is preferably formed of extruded aluminum, is provided with roof-shaped sealing lips 9,10 which seal the interior of the casing and through which the blade-shaped base 8 of the driving unit 7 passes.

The scanning unit 3 is precisely positioned against the scale 2 by means of glide shoes 11 which contact a guide surface 12 formed by the scale 2 and by means of a glide shoe 13 which bears on a guide surface 14 on the scale 2. The scanning unit 3 is biased against the mutually perpendicular guide surfaces 12,14 by two pressure springs 15,16, each of which urges the scanning unit 3 against one of the guide surfaces 12,14. Both of the spring 15,16 are mounted such that each spring's axis of symmetry extends from the scanning unit 3 to the driving unit 7 with one end bearing on the scanning unit 3 and the other end on the driving unit 7. One of the advantages of this arrangement is that no guide surfaces are needed on the housing 1. In fact, this arrangement can be used even when no housing is present.

In FIGS. 2a and 2b, another embodiment of the invention is represented in which the scanning unit 3' is provided with glide shoes 11' which rest on a guide surface 12' defined by the scale 2'. The scanning unit 3' is also provided with ball bearing rollers 21 which contact a guide surface 22 defined by the housing 1. The scanning unit 3' is pressed against the two mutually perpendicular guide surfaces 12',22 on the scale 2' and the housing 1, respectively, by two pressure springs 15',16'. Each of these springs 15',16' is positioned with its axis of symmetry extending from the scanning unit 3' to the housing 1 such that the spring bears against the scanning unit 3' at one end and one of the guide surfaces 25,26 of the housing 1 at the other end by means of ball bearing rollers 23,24. The spring 15' is a leaf spring oriented such that a line lying in the plane of the spring 15' and transverse to the axis of symmetry of the spring 15' is parallel to the guide surface 12' and perpendicular to the guide surface 22. The spring 16' is also a leaf spring, oriented such that a line lying in the plane of the spring 16' and transverse to the axis of symmetry of the spring 16' is parallel to the guide surface 22 and perpendicular to the guide surface 12'. The points at which the springs 15' and 16' are attached to the scanning unit 3' all lie in a plane perpendicular to both guide surfaces 12' and 22 and the two springs 15', 16' operate substantially independently of each other. One of the advantages of this type of arrangement is that the force with which the scanning unit 3' is urged against the guide surfaces 12' and 22 is substantially independent of the position of the driving unit with respect to the housing. Throughout a range of construction tolerances, the pressure forces remain substantially constant.

In FIGS. 3a and 3b there is represented a third preferred embodiment of a longitudinal measurement device in which the scanning unit 3" is guided by means of glide shoes 11" which bear on the guide surface 12" of the scale 2" and by means of ball bearing rollers 21' which bear on a guide surface 22' of the housing 1. The pressing of the scanning unit 3" on the mutually perpendicular guide surfaces 12",22' of the scale 2" and the housing 1, respectively, results from two pressure springs 15",16", each of which is associated with one of the guide surfaces 12",22'. One pressure spring 15" is mounted so that one end bears on the scanning unit 3" and the other on the driving unit 7", while the other pressure spring 16" is mounted to bear at one end on the scanning unit 3" and at the other end on the guide surface 26' of the housing 1 by means of a ball bearing roller 24'.

In FIGS. 4a and 4b a fourth preferred embodiment of the invention is represented in which the scanning unit 3''' is guided at a guide surface 30 by means of ball bearing rollers 31 and at a guide surface 22" by means of a ball bearing roller 21". Here, both guide surfaces 22" and 30 are defined by the housing 1. The pressing of the scanning unit 3''' onto the mutually perpendicular guide surfaces 30,22" of the housing 1 results from two pressure springs 15''' and 16'''. Each of the springs 15''' and 16''' is associated with one of the guide surfaces 30,22". One pressure spring 15''' bears on the scanning unit 3''' at one end and on the driving unit 7''' at the other end, while the other pressure spring 16''' bears on the scanning unit 3''' at one end and on the guide surface 26" of the housing 1 at the other end via a ball bearing roller 24".

The longitudinal measurement device of the present invention provides for the separation of the functions of coupling and guiding the scanning unit with respect to the scale. In this way an optimal coupling can be obtained between the scanning unit and the driving unit without compromising guidance. At the same time, the invention provides for the separate setting of the pressure force with which the scanning unit is pressed against each of the guide surfaces on the scale and/or the support structure through proper selection of the pressure springs. In this way, bending of the scale and measurement errors resulting from the application of excessive guiding force on the scale can be avoided.

. Of course, it should be understood that various changes and modifications to the preferred embodiments described herein will be apparent to those skilled in the art. For example, the guidance structures described above can be used in other types of optical, inductive and capacitive measuring devices. Furthermore, other types of springs may be substituted for the plate springs and coil springs depicted in the drawings. Such changes and modifications can be made without departing from the scope of the present invention and without diminishing its attendant advantages. It is, therefore, intended that such changes and modifications be covered by the following claims.

We claim:

1. An apparatus for positioning a scanning unit in a longitudinal measuring device, said measuring device including a measuring scale, a driving unit for connecting the device to an object whose position is to be measured, and first and second mutually perpendicular guide surfaces for guiding the scanning unit along the scale, said apparatus comprising:

a support structure positioned alongside the scale;

means for connecting the scanning unit to the driving unit in a flexible manner, said connecting means including a coupling element connected between the scanning unit and the driving unit and operative to maintain a substantially constant spacing therebetween;

first spring means positioned to exert a spring force between the scanning unit and the support structure, for biasing the scanning unit into contact with the first guide surface formed by the scale and substantially in no other direction; and second spring means positioned to exert a spring force between the scanning unit and the support structure, for biasing and scanning unit into contact with the second guide surface formed by the support structure ane substantially in no other direction, said two spring means operating substantially independently of each other.

2. The apparatus of claim 1 wherein the first and second spring means include first and second springs, respectively.

3. The apparatus of claim 2 wherein each spring is provided with a roller mounted to contact the support structure.

4. In a longitudinal measuring device including a measuring scale, a scanning unit movable along the scale, a driving unit adapted for connection with an object whose position is to be measured, and first and second mutually perpendicular guide surfaces for guiding the scanning unit along the scale, the improvement comprising:

a housing substantially surrounding the scale;

a flexible coupling rod extending substantially parallel to the scale, connected at a first point to the driving unit and at a second point to the scanning unit, said rod acting to maintain a substantially constant spacing therebetween;

a first spring mounted to exert a spring force between the scanning unit and a first opposing surface formed by the housing, to bias the scanning unit towards the first guide surface formed by the scale and exerting substantially no force in any other direction; and a second spring mounted substantially transversely to the first spring to exert a spring force between the scanning unit and a second opposing surface formed by the housing, to bias the scanning unit towards the second guide surface formed by the housing and exerting substantially no force in any other direction, said two springs operating independently of each other.

5. The apparatus of claim 4 wherein the first and second springs are mounted to the scanning unit and the first and second springs are provided with rollers which contact the first and second opposing surfaces, respectively.

6. In a longitudinal measuring device including a measuring scale, a scanning unit movable along the scale, a driving unit adapted for connection with an object whose position is to be measured, and first and second mutually perpendicular guide surfaces parallel to the measuring scale for guiding the scanning unit along the scale, the improvement comprising:

a housing substantially surrounding the scale and lying parallel thereto having surfaces parallel to the guide surfaces;

coupling means flexibly connecting the driving unit to the scanning unit such that the driving unit through the coupling means exerts force on the scanning unit in the direction parallel to the measuring scale to separate the function of the coupling of the scanning unit from the function of biasing of the scanning unit against the guide surfaces;

a first leaf spring having a roller mounted to one end thereof, the leaf spring extending between the scanning unit and the housing with the roller contacting a surface of the housing parallel to the first guide surface, the leaf spring oriented such that a line lying in the plane of the spring and transverse to the axis of symmetry of the spring is parallel to the first guide surface and perpendicular to the second guide surface, for biasing the scanning unit against the first guide surface formed by the scale and substantially in no other direction; and a second leaf spring having a roller mounted to one end thereof, the leaf spring extending between the scanning unit and the housing with the roller contacting a surface of the housing parallel to the second guide surface, the leaf spring oriented such that a line lying in the plane of the spring and transverse to the axis of symmetry of the spring is parallel to the second guide surface and perpendicular to the first guide surface, for biasing the scanning unit against the second guide surface formed by the housing and substantially in no other direction, with points at which the first spring is attached to the scanning unit and points at which the second spring is attached to the scanning unit all lying in a plane perpendicular to both guide surfaces, the two springs operating substantially independently of each other.

* * * * *

UNITED STATES PATENT AND TRADEMARK OFFICE
CERTIFICATE OF CORRECTION

PATENT NO. : 4,295,742
DATED : October 20, 1981
INVENTOR(S) : Gunther Nelle and Gunter Swassek It is certified that error appears in the above—identified patent and that said Letters Patent is hereby corrected as shown below:

In Figure 2b, on the right-hand side, the number "21'" should be --21--.

In column 5, line 17, delete "and" and insert therefor --the--.

In column 5, line 19, delete "ane" and insert therefor --and--.

Signed and Sealed this

Eleventh Day of May 1982

[SEAL]

Attest:

GERALD J. MOSSINGHOFF

*Attesting Officer*     Commissioner of Patents and Trademarks